(12) United States Patent
Clark

(10) Patent No.: US 8,113,820 B2
(45) Date of Patent: Feb. 14, 2012

(54) METHOD AND APPARATUS FOR MOLDING AND ASSEMBLING PLURAL-PART PLASTIC ASSEMBLIES

(75) Inventor: Wade L. Clark, Rockford, IL (US)

(73) Assignee: Electroform Company, Inc., Machesney Park, IL (US)

( * ) Notice: Subject to any disclaimer, the term of this patent is extended or adjusted under 35 U.S.C. 154(b) by 0 days.

(21) Appl. No.: 13/034,164

(22) Filed: Feb. 24, 2011

(65) Prior Publication Data

US 2011/0206796 A1    Aug. 25, 2011

Related U.S. Application Data

(62) Division of application No. 11/453,179, filed on Jun. 13, 2006, now Pat. No. 7,951,322.

(51) Int. Cl.
*B29C 45/06* (2006.01)
*B29C 45/14* (2006.01)

(52) U.S. Cl. .................... 425/576; 425/117; 425/588

(58) Field of Classification Search .............. 264/328.8, 264/261, 263; 425/117, 556, 576, 588, 589
See application file for complete search history.

(56) References Cited

U.S. PATENT DOCUMENTS

| | | | |
|---|---|---|---|
| 1,942,993 A | 1/1934 | Aultman et al. | |
| 2,478,812 A | 8/1949 | Drake | |
| 2,949,696 A | 8/1960 | Easterling | |
| 2,956,611 A | 10/1960 | Jendrisak et al. | |
| 3,224,043 A | 12/1965 | Lameris et al. | |
| 3,733,162 A | 5/1973 | Farkas | |
| 3,825,457 A | 7/1974 | Holroyd et al. | |
| 3,985,485 A | 10/1976 | Farrell | |
| 4,218,204 A | 8/1980 | Edwards | |
| 4,330,257 A | 5/1982 | Rees et al. | |
| 4,408,980 A | 10/1983 | Gallizia | |
| 4,449,913 A | 5/1984 | Krishnakumar et al. | |
| 4,744,741 A | 5/1988 | Glover et al. | |
| 5,015,425 A | 5/1991 | Mimata et al. | |
| 5,112,556 A | 5/1992 | Miller | |
| 5,221,538 A * | 6/1993 | Gasami et al. | ................ 425/127 |
| 5,268,183 A | 12/1993 | Garza | |
| 5,358,397 A | 10/1994 | Ligon et al. | |
| 5,378,422 A | 1/1995 | Musiel et al. | |

(Continued)

FOREIGN PATENT DOCUMENTS

CA         2375668 A1    7/2000

(Continued)

OTHER PUBLICATIONS

Supplementary European Search Report, European Patent Application No. EP 07 08 9447, 2 pages, dated Apr. 7, 2010.

(Continued)

*Primary Examiner* — Yogendra Gupta
*Assistant Examiner* — Emmnauel S Luk
(74) *Attorney, Agent, or Firm* — Edwards Wildman Palmer LLP

(57) ABSTRACT

Method and apparatus for molding and assembling a composition part assembly in, for example, a plastic injection-molding machine. Complementary mold portions associated with a mold plate and rotatable turret form plural parts. Assembly apparatus associated with the turret assembles the plural parts into an assembly. A further turret may be provided to add a complementary part to the assembly to make a final assembly. The method includes manufacture of composite part assemblies and final assemblies.

20 Claims, 14 Drawing Sheets

U.S. PATENT DOCUMENTS

| | | | |
|---|---|---|---|
| 5,413,743 A | 5/1995 | Prophet | |
| 5,705,112 A | 1/1998 | Gram | |
| 5,728,409 A | 3/1998 | Schad et al. | |
| 5,750,162 A | 5/1998 | Schad et al. | |
| 5,817,345 A | 10/1998 | Koch et al. | |
| 5,830,404 A | 11/1998 | Schad et al. | |
| 6,322,738 B1 | 11/2001 | Sicilia et al. | |
| 6,383,849 B1 | 5/2002 | Choi | |
| 6,386,849 B1 | 5/2002 | Kroeger et al. | |
| 6,393,992 B1 | 5/2002 | Vasel et al. | |
| 6,431,543 B1 | 8/2002 | Cole et al. | |
| 6,447,280 B1 | 9/2002 | Grimm | |
| 6,461,141 B1 | 10/2002 | Harrison et al. | |
| 6,464,921 B1 | 10/2002 | Armbruster | |
| 6,503,073 B2 | 1/2003 | Marshall et al. | |
| 6,503,075 B1 | 1/2003 | Schad et al. | |
| 6,517,334 B1 | 2/2003 | Neuschwander | |
| 6,543,365 B1 | 4/2003 | Vasel et al. | |
| 6,546,874 B2 | 4/2003 | Vasel et al. | |
| 6,558,149 B1 | 5/2003 | Bodmer et al. | |
| 6,620,353 B2 | 9/2003 | Abrams et al. | |
| 6,638,455 B1 | 10/2003 | Bodmer et al. | |
| 6,702,469 B1 | 3/2004 | Taniguchi et al. | |
| 6,783,346 B2 | 8/2004 | Bodmer et al. | |
| 7,052,270 B2 | 5/2006 | Unterlander et al. | |
| 7,081,179 B2 | 7/2006 | Hartlmeier et al. | |
| 7,081,222 B2 | 7/2006 | Gram | |
| 7,128,553 B2 | 10/2006 | Shakal | |
| 7,150,845 B1 | 12/2006 | Gram | |
| 7,165,964 B2 | 1/2007 | Schuessler | |
| 7,194,960 B2 | 3/2007 | Vasel et al. | |
| 7,452,202 B2 * | 11/2008 | Gram | 425/588 |
| 7,497,676 B2 * | 3/2009 | Gram | 425/123 |
| 7,604,764 B2 * | 10/2009 | Arai et al. | 264/263 |
| 7,670,125 B2 | 3/2010 | Armbruster | |
| 2002/0185778 A1 | 12/2002 | Armbruster | |
| 2003/0047105 A1 | 3/2003 | Vasel et al. | |
| 2003/0175375 A1 | 9/2003 | Bodmer et al. | |
| 2004/0033287 A1 | 2/2004 | Gram | |
| 2004/0075195 A1 | 4/2004 | Gram | |
| 2004/0119200 A1 | 6/2004 | Gram | |
| 2004/0124558 A1 | 7/2004 | Gram | |
| 2004/0211509 A1 | 10/2004 | Hartlmeier et al. | |
| 2005/0003100 A1 | 1/2005 | Gram | |
| 2005/0017413 A1 | 1/2005 | Gram et al. | |
| 2006/0033238 A1 | 2/2006 | Gram | |
| 2006/0093699 A1 | 5/2006 | Arakelyan | |
| 2006/0127526 A1 | 6/2006 | Gram | |
| 2006/0244178 A1 | 11/2006 | Armbruster | |
| 2008/0280082 A1 | 11/2008 | Abate | |

FOREIGN PATENT DOCUMENTS

| | | | |
|---|---|---|---|
| DE | 4123690 A1 | 2/1992 | |
| EP | 1027199 | 9/1998 | |
| EP | 1058612 | 12/2000 | |
| EP | 1475209 A1 | 11/2004 | |
| EP | 1237701 B1 | 8/2006 | |
| JP | 10314343 | 12/1998 | |
| JP | 2001205681 A | 7/2001 | |
| WO | 9101213 | 7/1991 | |
| WO | 9313927 | 7/1993 | |
| WO | 9835808 | 8/1998 | |
| WO | 9838021 | 9/1998 | |
| WO | 0073040 A1 | 12/2000 | |
| WO | 03049917 A1 | 6/2003 | |
| WO | 2004062880 A1 | 7/2004 | |
| WO | 2004103676 A2 | 12/2004 | |
| WO | 2005007381 A2 | 1/2005 | |
| WO | 2005077637 A1 | 8/2005 | |
| WO | 2007054235 A2 | 5/2007 | |

OTHER PUBLICATIONS

Informal Comments to Written Opinion, PCT International Application No. PCT/US2007/13663, 6 pages, dated Aug. 19, 2008.

* cited by examiner

METHOD AND APPARATUS FOR MOLDING AND ASSEMBLING PLURAL-PART PLASTIC ASSEMBLIES

RELATED APPLICATIONS

The present application is a divisional of and claims priority to U.S. patent application Ser. No. 11/453,179, filed Jun. 13, 2006 now U.S. Pat. No. 7,951,322.

FIELD

The field relates generally to manufacture of composite articles and, more specifically, to manufacture of assemblies of injection-molded parts.

BACKGROUND

Manufacturers of injection-molded parts have an ongoing need to make a wide range of parts in a highly efficient and cost-effective manner. Increasingly, there is a need to provide composite part assemblies made up of plural component parts. These composite part assemblies frequently require movement by one or more of the component parts. Representative composite part assemblies which include movable parts are closures of the type used for packaging of food and personal care products.

Manufacture of composite part assemblies may require separate forming and assembly steps in which the component parts are first formed in the mold and then assembled to make the finished product. Separate forming and assembly steps can decrease throughput and increase the cost of the finished product.

One approach toward improving the efficiency of manufacturing composite parts is referred to by some as in-mold assembly. In-mold assembly refers to the forming of one or more parts followed by assembly of the parts before ejection from the mold. Various approaches to in-mold assembly have been proposed. Examples include: U.S. Patent Publication Nos. 2006/0033238 (Gram), 2004/0033287 (Gram) and 2004/0119200 (Gram) and U.S. Pat. Nos. 4,744,741 (Glover et al.) and 4,330,257 (Rees et al.). These approaches have certain disadvantages and limitations associated with them.

For example, the process described in Publication No. 2006/0033238 relates to production of hinged-together plastic objects. After part formation, a closing mechanism works in combination with a rotating tool to partially close one portion of the hinged part while a portion of the hinged part remains in the tool. This process lacks the capability of assembling a finished part consisting of separate plural parts.

The process described in Publication No. 2004/0033287 relates to forming and assembly of at least two part objects. Separate parts are formed in separate rotating tools. After forming, the part edge surfaces are heated and the rotating tools are moved together so that the heated edge surfaces touch and are thermally bonded together. This process has limitations in that thermal joining of parts may not be satisfactory for certain other types of manufacturing processes.

U.S. Pat. No. 4,744,741 describes a process for simultaneous forming and assembly of plural-part molded objects. This process requires thermal bonding of the parts immediately following forming and may be subject to unduly long cycle times because coordinated movement of separate tools is required to assemble the parts.

U.S. Pat. No. 4,330,257 describes a process for efficient forming of molded parts using a rotating tool but does not provide for assembly of the parts.

It would represent a significant improvement in the art to provide a method and apparatus for molding and assembling of plural-part plastic assemblies which would facilitate the manufacture of plural-part assemblies, which would facilitate manufacture of assemblies including one or more moving parts, which would increase throughput and decrease production cycle times and which would be efficient and cost-effective to implement.

BRIEF DESCRIPTION OF THE DRAWINGS

The invention may be understood by reference to the following description taken in conjunction with the accompanying drawings, in which like reference numerals identify like elements throughout the different views. The drawings are not necessarily to scale, emphasis instead being placed upon illustrating the principles of the invention.

DETAILED DESCRIPTION

FIGS. 3-15 are schematic diagrams showing an embodiment of an injection-molding and assembly apparatus 10. Injection-molding and assembly apparatus 10 is provided to make separate parts and to efficiently and rapidly assemble the parts into composite part assemblies.

Figure 2:
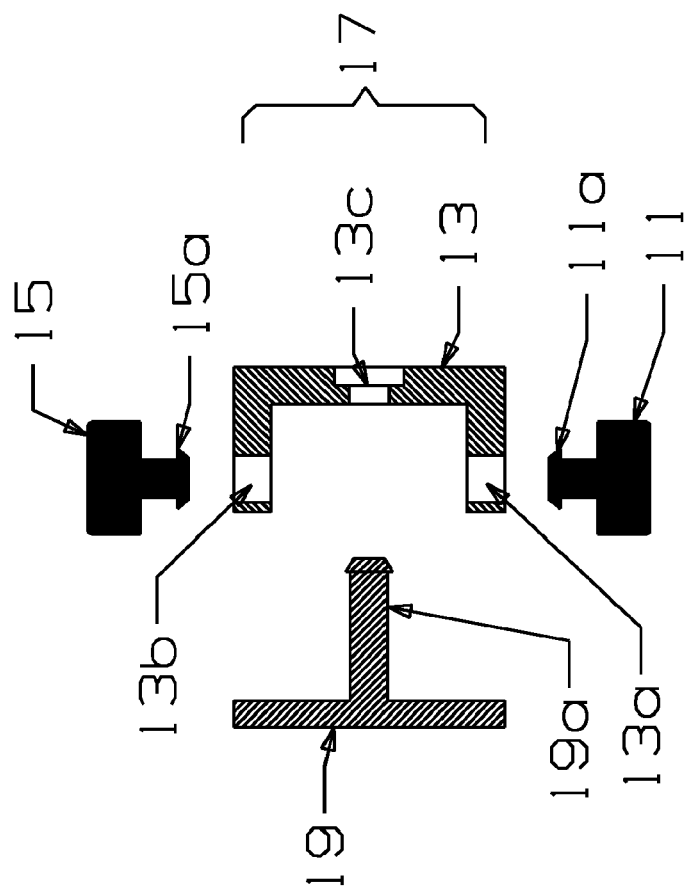
FIG. 2 is a schematic diagram showing an exploded view of the exemplary parts comprising the final assembly of FIG. 1.
Figure 1:
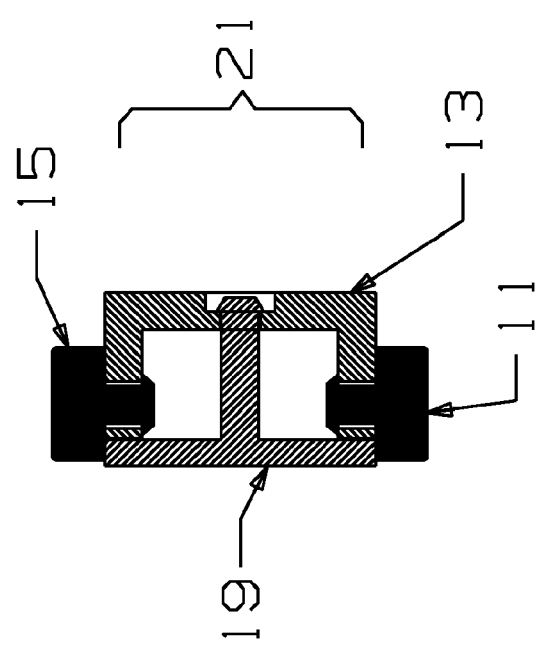
FIG. 1 is a schematic diagram showing an exemplary composite part final assembly made according to the present improvement.

FIGS. 1 and 2 show exemplary parts 11, 13, 15, 19, a composite part assembly 17 and a final assembly 21 capable of being made with the injection-molding and assembly apparatus 10. In the example, parts 11, 13, 15 are first formed in a mold. The apparatus 10 then assembles parts 11-15 into a composite part assembly 17 while parts 11-15 remain associated with a mold portion in which they are formed. Male parts 11a, 15a are seated in respective female parts 13a, 13b forming assembly 17 in this example. Injection-molding and assembly apparatus 10 embodiments may include machine structure permitting assembly 17, as a sub-assembly, and a complementary part 19 or parts to be assembled together into a final assembly 21.

Apparatus 10 enables parts 11, 13, 15, 19 to be joined together mechanically, permitting automatic manufacture of complex assemblies 17, 21, including assemblies with complex moving parts thereby providing the manufacturer with a heretofore unavailable level of manufacturing capabilities. And, apparatus 10 eliminates separate assembly steps occurring after ejection of the parts completely from the mold thereby reducing both manufacturing costs and production cycle time.

The injection-molding and assembly apparatus 10 embodiment shown schematically in FIGS. 3-15 is preferably adapted for use in conjunction with any vertical or horizontal platen injection-molding machine. The exemplary injection-molding and assembly apparatus 10 comprises base 23, turrets 25, 27 and related components and actuators as described herein. As will be discussed in more detail below, the number of turrets utilized is not critical as any number of turrets may be utilized depending on the manufacturer's requirements.

Base 23 is mounted with respect to the injection-molding machine (not shown) between mold plates 29, 31. Mold plates 29, 31 are displaced relative to the other to increase and, alternatively, decrease the distance between mold plates 29, 31 by a displacement actuator 35. Relatively displaced means or refers to any arrangement in which the distance between parts may be increased or decreased. Therefore, both of mold plates 29, 31 may be movable or one mold plate (e.g., mold plate 29) may be stationary while the other mold plate (e.g., mold plate 31) is movable toward and away from the other.

Figure 3:
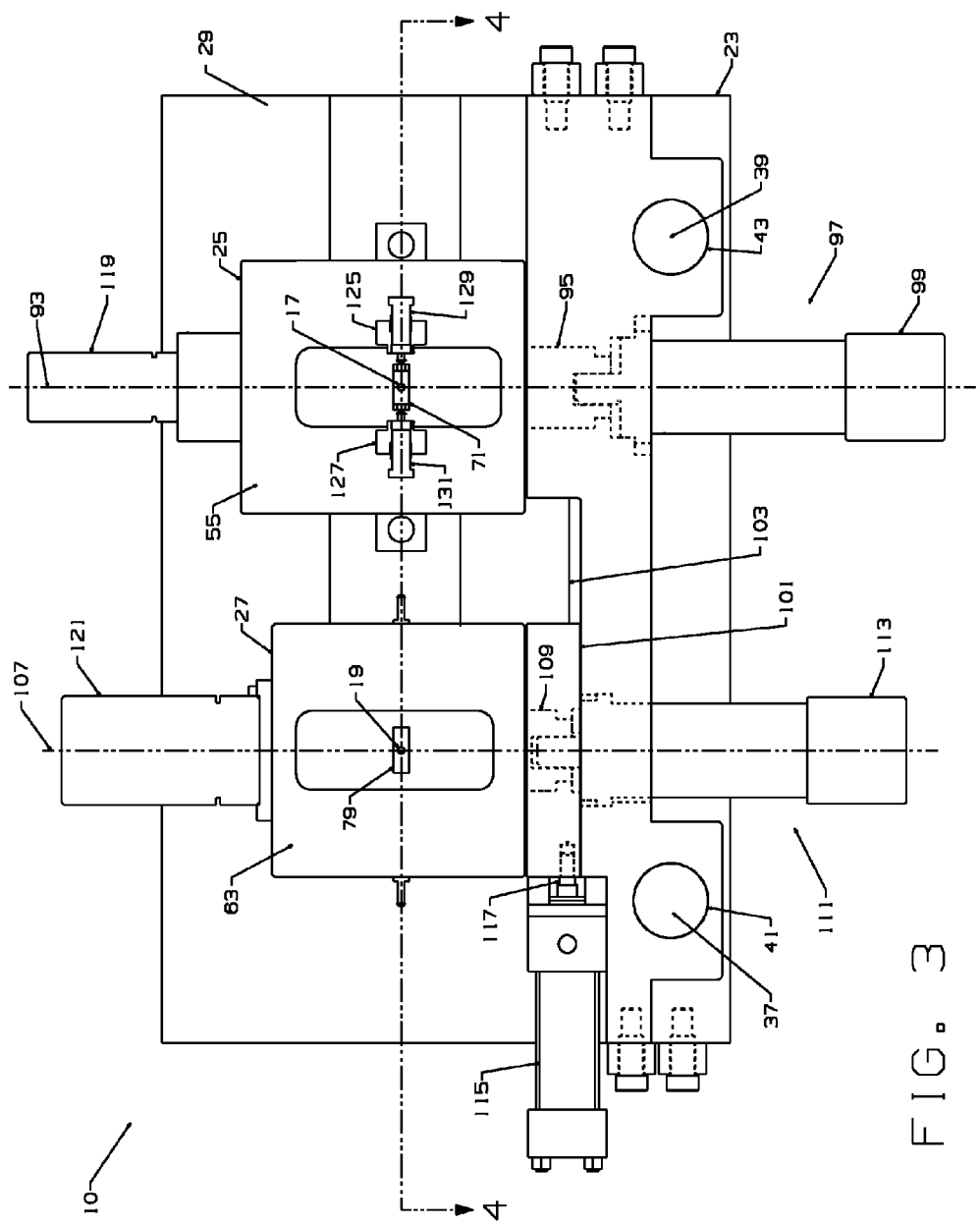
FIG. 3 is a schematic diagram showing a side elevation view of an injection-molding and assembly apparatus embodying the present improvement. The apparatus is shown with each turret in a forming operating position in which parts are formed.
Figure 4:
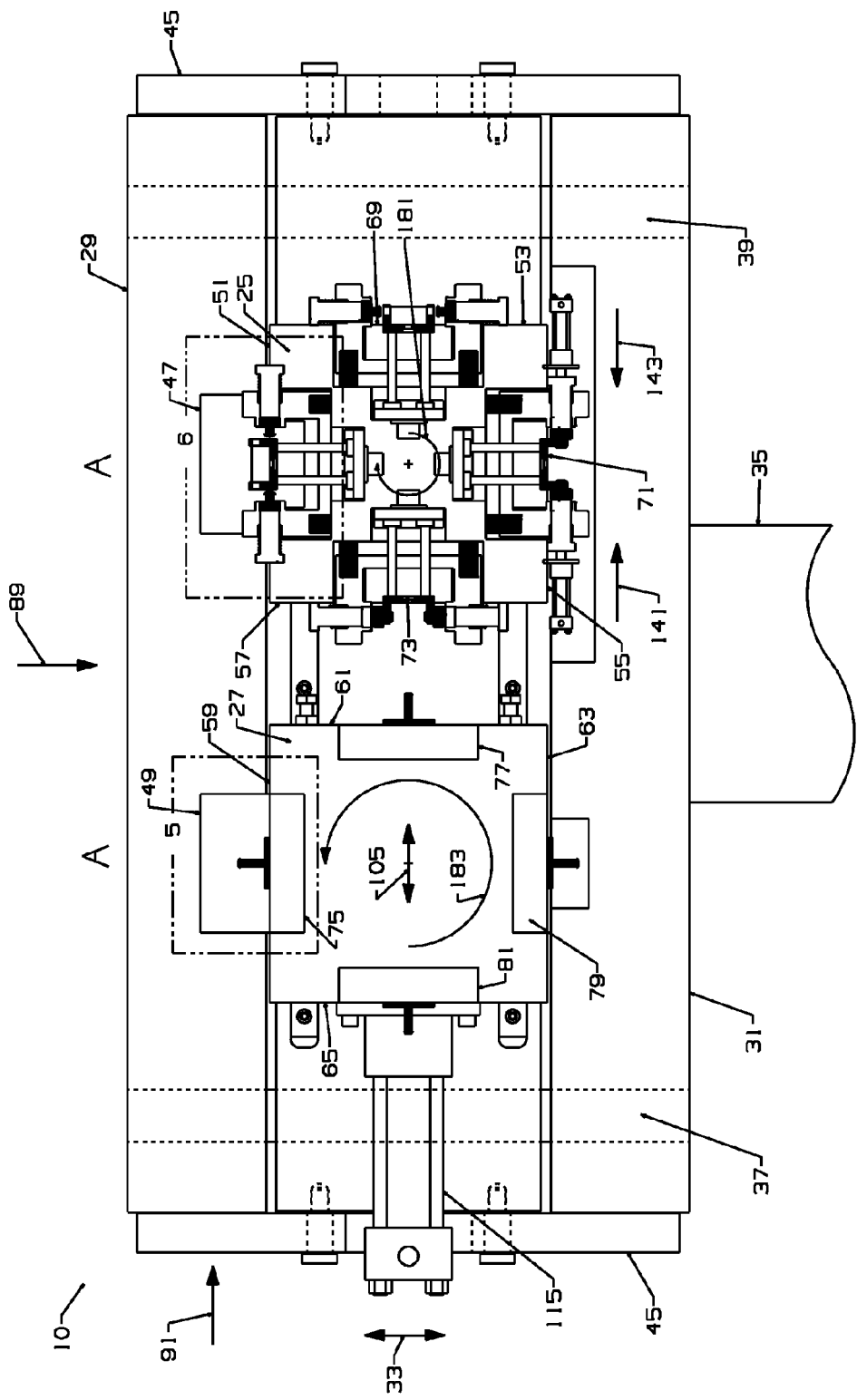
FIG. 4 is a schematic diagram showing a top view of the injection-molding and assembly apparatus taken along section 4-4 of FIG. 3.
Figure 5:
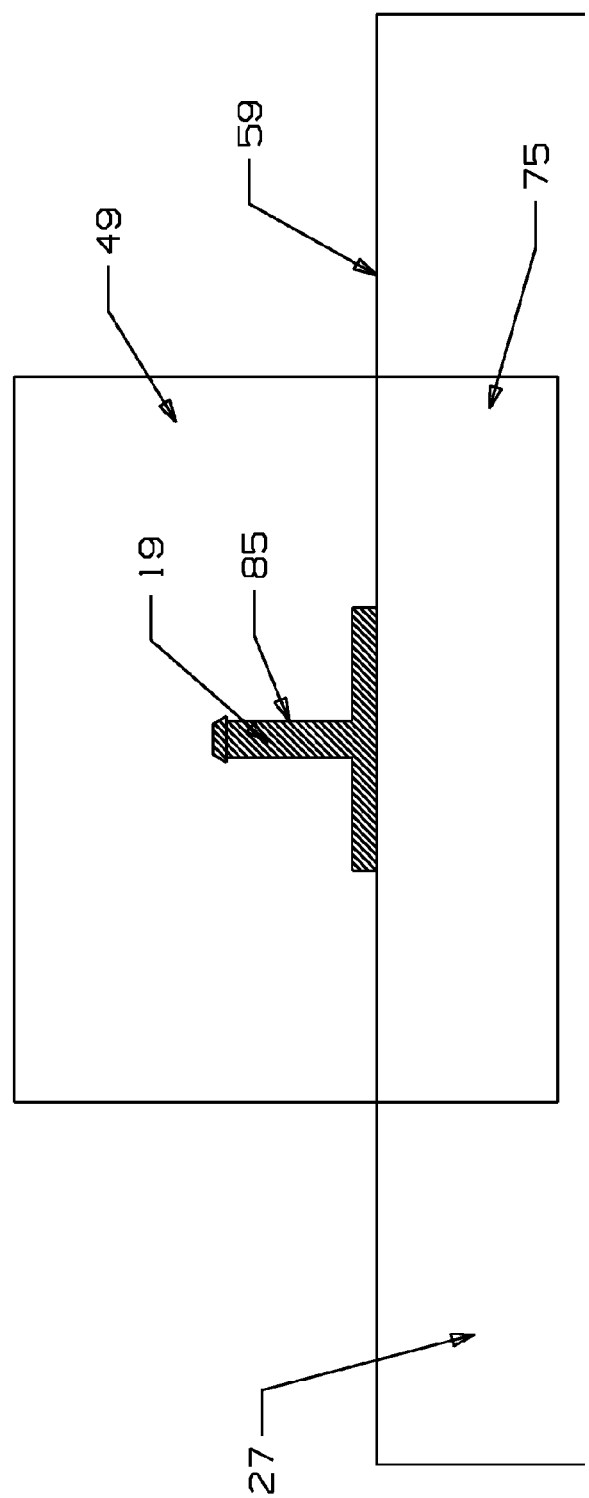
FIG. 5 is an enlarged schematic diagram of a mold cavity and formed part taken along detail section 5 of FIG. 4.

In the preferred embodiment of FIGS. 3-15, mold plate 29 is stationary and mold plate 31 is movable toward and away from mold plate 29 along a path in the directions of dual-headed arrow 33 (FIG. 4). In the embodiment, displacement actuator 35 is the reciprocating hydraulic ram (identified by reference number 35) of the injection-molding machine. Ram 35 displaces mold plate 31. The term actuator as used herein means or refers to a mechanism that puts another part into automatic action. While ram 35 is a preferred actuator, any suitable actuator may be provided to displace mold plate 31. Exemplary actuators include a rack-and-pinion mechanism, a mechanical screw and a hydraulic actuator. Mold plate 31 translates toward and, alternatively, away from mold plate 29, base 23 and turrets 25, 27 of apparatus 10 in the directions of dual-headed arrow 33 during each production cycle as described below.

In the embodiment, base 23 is movably mounted on rods 37, 39 extending outwardly from mold plate 29 and between mold plates 29, 31. Rods 37, 39 are received in sleeves 41, 43 provided in base 23. Bearings (not shown) within sleeves 41, 43 facilitate displacement of base 23 along rods 37, 39. As an alternative to rods 37, 39, base 23 may be supported by the tie bars or guides of the injection molding machine.

Base 23 is displaced relative to mold plates 29, 31 to increase and, alternatively, decrease the distance between base 23 and mold plates 29, 31 to free turrets 25, 27 for rotation between operating positions. Ram-driven movement of mold plate 31 moves base 23 along the path represented by dual-headed arrow 33. More specifically, movement of mold plate 31 toward mold plate 29 causes mold plate 31 to contact base 23 and to push base 23 toward and into contact with mold plate 29. Base 23 and turrets 25, 27 are clamped between mold plates 29, 31 by extension of ram 35 (FIGS. 4, 7, 9, 11) closing mold cavities 83, 85.

Mold plate 31 and base 23 may be connected together through a linkage 45. Linkage 45 may comprise a chain, mechanical latch or other mechanical linkage. Ram-driven movement of mold plate 31 away from mold plate 29 causes mold plate 31 to pull base 23 away from mold plate 29 through linkage 45. Linkage 45 is sized to permit spacing between base 23 and mold plate 29 and between base 23 and mold plate 31 when mold plate 31 is retracted by ram 35 to the position of FIG. 13 in which mold cavities 83, 85 are opened. As noted, such spacing frees turrets 25, 27 for rotation between operating positions. In the example, ram 35 controls relative displacement of turrets 25, 27 and mold plates 29, 31.

In other embodiments, an actuator or drive mechanism, other than the ram actuator 35, may be provided to displace base 23 (and turrets 25, 27 mounted thereon) along the path represented by dual-headed arrow 33 and to control displacement of base 23 relative to mold plates 29, 31. By way of example only, a rack-and-pinion mechanism, mechanical screw or hydraulic actuator could be used to displace base 23 between the positions shown in FIGS. 4 and 13.

In the example, mold plate 29 is shown supporting or carrying a pair of mold portions 47, 49. Mold portions 47, 49 may be referred herein as first mold portions. Any number of mold portions 47, 49 may be utilized as required by the manufacturer. Mold portions 47, 49 may be elements which are secured to mold plate 29 by, for example, threaded fasteners (not shown). Alternatively, mold portions 47, 49 may be formed directly in mold plate 29. Mold portions 47, 49 may be of any suitable design and may comprise cores, cavities and combinations thereof.

Each turret 25, 27 is preferably provided with one or more face 51, 59. In the example, each turret 25, 27 has four faces 51, 53, 55, 57 and 59, 61, 63, 65. Each face 51-57 and 59-65 is provided to support or carry a mold portion 67, 69, 71, 73, 75, 77, 79, 81. In the two turret 25, 27 example shown, mold portions 67-73 have an identical structure and mold portions 75-81 each have an identical structure. Mold portions 67-81 may be referred herein as second, or complementary, mold portions. Mold portions 67-73 are the complement of mold portion 47 and mold portions 75-81 are the complement of mold portion 49. Mold portions 67-81 may be of any suitable design complementary to respective molds 47, 49 and may comprise cores, cavities and combinations thereof. Any number of mold portions 67-81 may be utilized depending on the overall mold configuration desired.

Mold portions 47, 49 and 67-81 may be adapted to receive and support parts and things useful in plastic part manufacture. For example, insert pieces (e.g., bushings, bearings, couplings, etc.) of metal and other materials may be supported by mold portions to become integral elements of the formed plastic parts once plastic material is injected into a mold cavity (e.g., cavity 83). By way of further example, films and substrates may be loaded in a mold portion 47, 49, 67-81 to become an integral element of the molded part.

Ram-driven 35 displacement of mold plate 31, base 23 and turrets 25, 27 toward mold plate 29 closes aligned mold portion 47 together with one of mold portions 67-73 and mold portion 49 together with one of mold portions 75-81 to provide separate mold cavities 83, 85 for forming parts when plastic material is injected therein. Such mold closure occurs with turrets 25, 27 in the forming operating position indicated as position A on FIG. 4. One or both of cavities 83, 85 comprises a multiplicity of cavities provided for forming plural separate and discrete parts as described herein. The cavities for forming the plural parts 11-15 can be provided by the same mold or plural molds. In the example, mold portions 67a, 67b define surfaces of mold cavities 83a, 83b. Molten plastic is admitted into mold plate 29 and into mold cavities 83, 85 by way of one or more barrels associated with the injection-molding machine (not shown) and through a runner system and gate (not shown) in mold plate 29 in the direction of arrows 89, 91 as described below. Of course, plastic material may be injected in other directions, including through mold plate 31 or, for example, by means of a "bolt on" plastic injection unit bolted to mold plate 29.

Preferably, mold portions 67-81 are secured to a respective turret 25, 27 by threaded fasteners. It is preferred that mold plate 29 and turrets 25, 27 be adapted to respectively support mold portions 47, 49 and 67-81 by means of fasteners because such arrangement provides the manufacturer with the flexibility to use many different mold portions with mold plate 29 and turrets 25, 27 for molding a variety of different plastic parts.

In the example, two turrets 25, 27 are shown and each turret is provided with four faces 51-57 and 59-65 providing the preferred turrets 25, 27 with a cube-like appearance. However, any number of turrets may be utilized depending on the needs of the manufacturer. Thus, one, two or more turrets may be utilized according to the principles described herein. Moreover, turrets 25, 27 may be provided with any suitable geometry and are not limited to the cube-like geometry with four faces or sides as shown. For example, turrets 25, 27 could each be provided with a triangular or octagonal geometry with a mold portion (e.g., mold portion 67) supported along each face or side thereof. Alternatively, and while not preferred for reasons of efficiency, each turret could be provided with a single face or side for supporting a mold portion (e.g. mold portion 67). It is not required that a "face" be provided. Any mounting location for a mold portion (e.g., one or more mold portions 67-81) will suffice. Alternatively, mold portions 67-81 may be formed directly in one or both turrets 25, 27.

In the example, turrets 25, 27 are rotatably mounted on base 23. Turret 25 is mounted on base 23 on a fixed position axis 93 by means of a shaft 95 journaled in base 23. An indexing apparatus 97 causes turret 25 to rotate or shift in an indexed manner between four operating positions. Indexing apparatus 97 preferably includes an actuator 99 linked to shaft 95. Actuator 99 is preferably a motor such as a stepper motor or servo motor.

Turret 27 is rotatably mounted on carriage 101. Carriage 101 travels along guide 103 of base 23 toward and, alternatively, away from turret 25 along a path in the directions of dual-headed arrow 105. Guide 103 can be rails, rods, walls, tracks or any suitable structure permitting movement of turret 27 along base 23 and carriage 101 can be any structure capable of supporting turret 27 along the guide. In the embodiment, the path of carriage 101 travel represented by dual-headed arrow 105 is transverse to the path of base 23 and mold plate 31 travel as represented by dual-headed arrow 33. Movement of turret 27 toward turret 25 enables separate parts 17, 19 carried on respective turrets 25, 27 to be joined together into final assembly 21 as described below.

Turret 27 carried on carriage 101 rotates on axis 107 spaced apart from axis 93 by means of shaft 109 journaled in carriage 101. Indexing apparatus 111 causes turret 27 to rotate or shift in an indexed manner between operating positions. Indexing apparatus 111 preferably includes a second actuator 113 linked to shaft 109. Actuator 113 is preferably a servo motor or a stepper motor such as described above in connection with actuator 99. Indexing apparatus 97, 111 could also comprise a linkage system synchronized to rotate turrets 25, 27 in response to ram-driven 35 movement of mold plate 31 rather than through motors 99, 113.

A further actuator, or turret-displacement actuator, 115 produces movement of carriage 101 along guide 103, alternatively, in the directions of dual-headed arrow 105. Actuator 115 is preferably a dual-action linear actuator linked to carriage 101 by means of actuator rod 117. Other types of mechanical apparatus may be utilized, for example a movement device operated by relative displacement of mold plates 29, 31.

In alternative embodiments, turret 25 and turret 27 could each be mounted for movement on a carriage 101 or another type of movement-enabling device. Such carriage or movement-enabling device may be driven, for example, by an actuator such as actuator 115. Such an arrangement would permit relative turret 25, 27 displacement so that each turret moves toward the other for assembly of final assembly 21. It is not required that turrets 25, 27 move relatively together to make a final assembly 21 or other part as it may be satisfactory in certain applications for each turret 25, 27 to produce parts (e.g., part assemblies 17) independent of the other.

Water may be introduced into turrets 25, 27 through a rotary union 119, 121 for the purpose of cooling turrets 25, 27 thereby minimizing the time required for each production cycle.

Persons of skill in the art will appreciate that actuators other than actuators 99, 113, 115 can be used to power movement of turrets 25, 27 and carriage 101. Many actuator types, such as rack-and-pinion mechanisms or air or hydraulic-powered actuators can be used.

Figure 9:
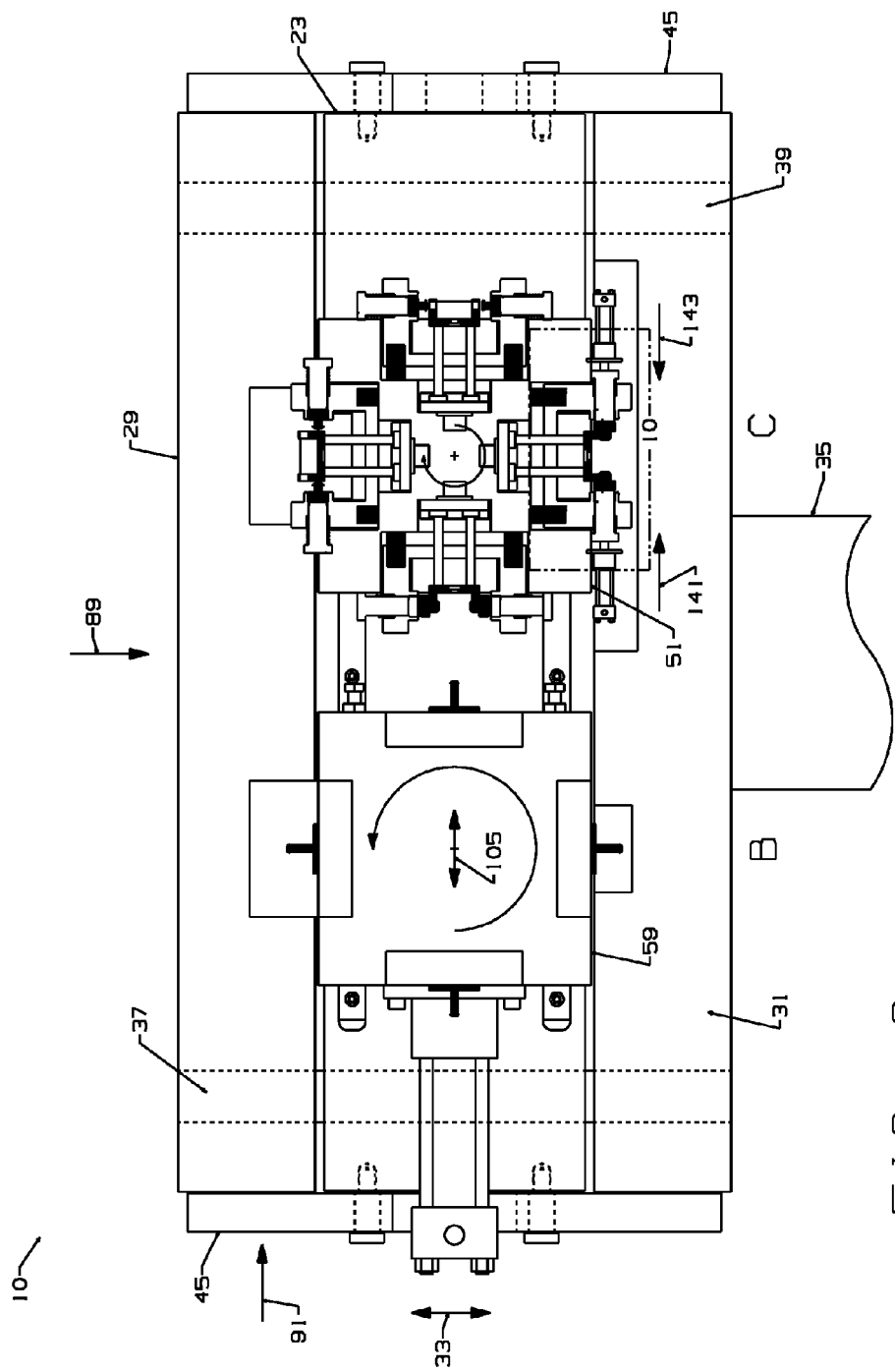
FIG. 9 is a schematic diagram showing a top view of the injection-molding and assembly apparatus taken along section 4-4 of FIG. 3 but with turrets rotated 180° from the position of FIGS. 3-4. The apparatus is shown with one turret in a further cooling operating position, and the other turret is in an assembly operating position in which the formed parts are assembled together.
Figure 10:
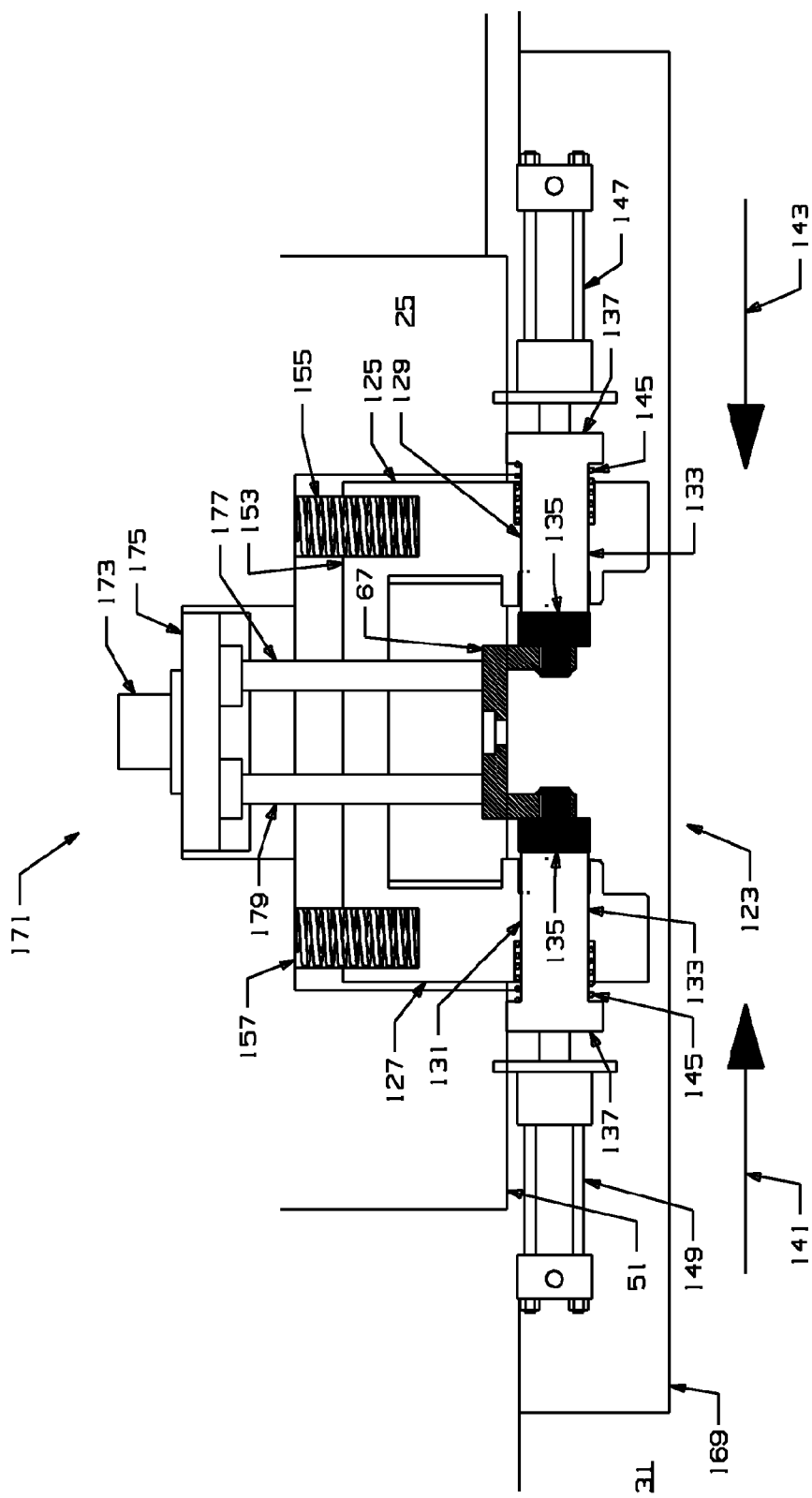
FIG. 10 is an enlarged schematic diagram taken along detail section 10 of FIG. 9.

Referring next FIGS. 9-10, assembly apparatus 123 (two shown along each face 51-57) are provided to assemble plural parts 11-15 into a composite part assembly 17 at an assembly operating position identified by position C on FIG. 9. In the embodiment, an assembly apparatus 123 is associated with each face 51-57 of turret 25. An assembly apparatus 123 could also be associated with the faces 59-65 of turret 27 depending on the manufacturer's requirements. Providing assembly apparatus 123 associated with each face 51-57 of turret 25 permits the manufacturer to improve throughput and reduce cost because a composite part assembly 17 can be manufactured from parts 11-15 formed along each face 51-57 of turret 25 without separate assembly steps following part ejection.

FIGS. 9-10 show assembly apparatus 123 along face 51 of turret 25. Each assembly apparatus 123 associated with faces 53-57 has the same structure and operation as assembly apparatus 123 associated with turret 25 face 51 in this example. Assembly apparatus 123 includes a pair of contact-element supports 125, 127 mounted on turret 25 proximate each face 51-57 and mold portion 67-73. Proximate means or refers to a position sufficiently close to the position of the formed parts (e.g., parts 11-15) to assemble the formed parts into an assembly (e.g., assembly 17). Each contact-element support 125, 127 supports at least one contact element 129, 131 mounted thereon. The contact elements 129, 131 urge a formed plural part 11 or 15 together into assembled contact with part 13 to form assembly 17. The contact-element supports 125, 127 of assembly apparatus 123 are carried on turret 25 such that contact-elements supports 125, 127 and contact elements 129, 131 travel with turret 25 as turret 25 rotates between the operating positions.

Each contact element 129, 131 has a body 133, a first end 135 and a second end 137 although other configurations may be utilized. Body 133 is mounted for reciprocating axial movement in opening 139 provided in contact-elements supports 125, 127. Opening 139 is oriented so that contact elements 129, 131 move inwardly toward mold portion 67 in the direction of arrows 141, 143 in FIGS. 4, 7 9, 10, 11, 13. A spring 145 biases each contact element 129, 131 away from mold portion 67. In the example, first end 135 of contact elements 129, 131 forms a wall or surface of mold portion 67a, 67b. Contact element first end 135 may be mechanical device which urges a part and need not form a portion of mold 67. And, in this example, mold portions 67a, 67b are joined with respective contact-element supports 125, 127. First end 135 contacts at least one of the formed plural parts (e.g. part 11 or 15) to urge such part or parts into assembled contact with another of the formed parts (e.g., part 13) in the assembly operating position C. Second end 137 is driven by an assembly actuator, or contact-element actuator, 147, 149 inwardly toward mold portion 67.

FIGS. 6, 8, 10, 12 and 14 show an enlarged view of an exemplary release apparatus 151 along face 51 of turret 25. A release apparatus 151 is associated with each face 51-57 and mold portion 67-73 as illustrated in FIGS. 4, 7, 9, 11 and 13. Each release apparatus 151 associated with faces 53-57 has the same structure and operation as release apparatus 151 associated with turret 25 face 51. Each release apparatus 151 is provided to partially release one or more of parts 11-15 from second or complementary mold portion 67, 69, 71 or 73 so that the parts are in alignment for assembly by contact element 129 or 131.

Figure 8:
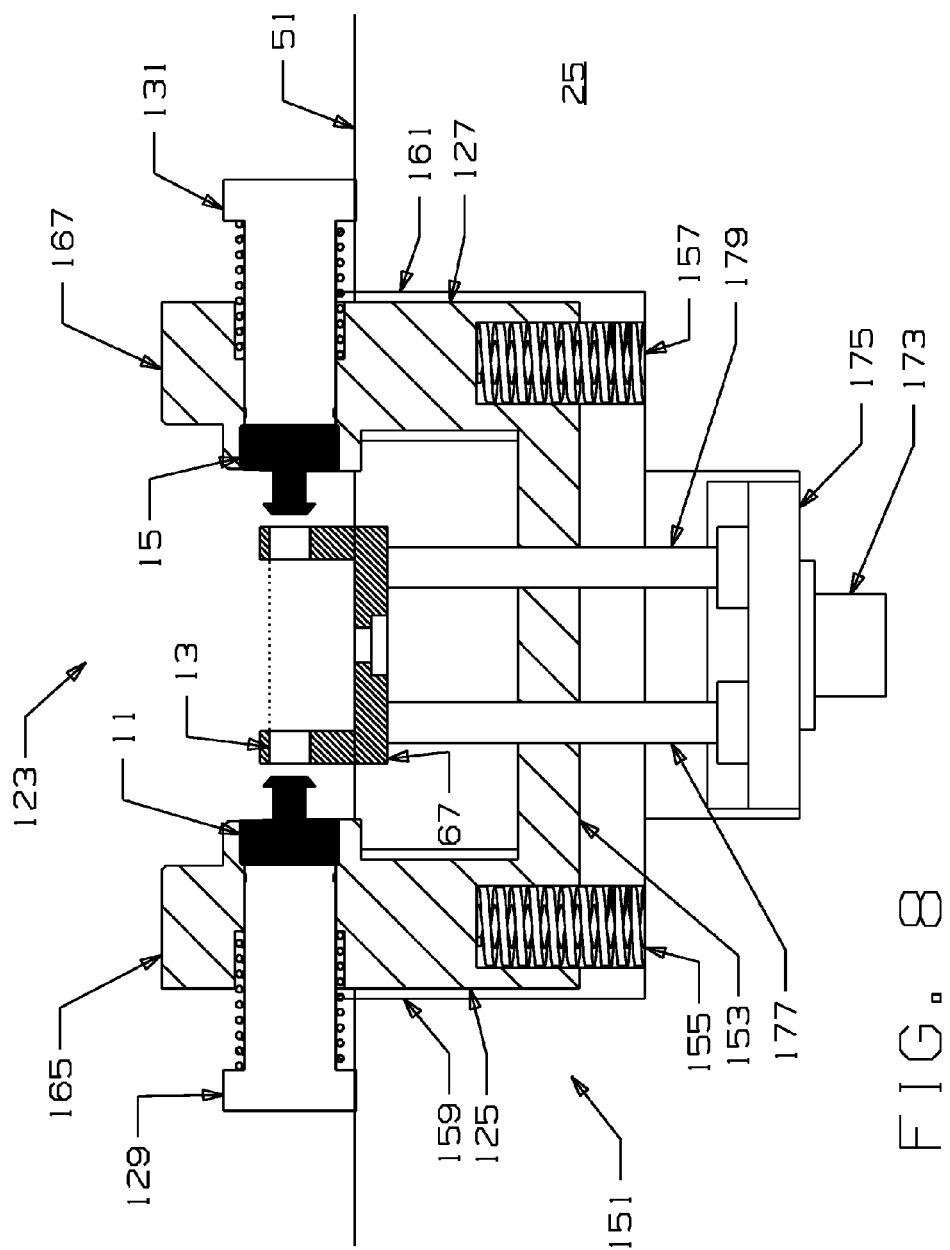
FIG. 8 is an enlarged schematic diagram taken along detail section 8 of FIG. 7.
Figure 12:
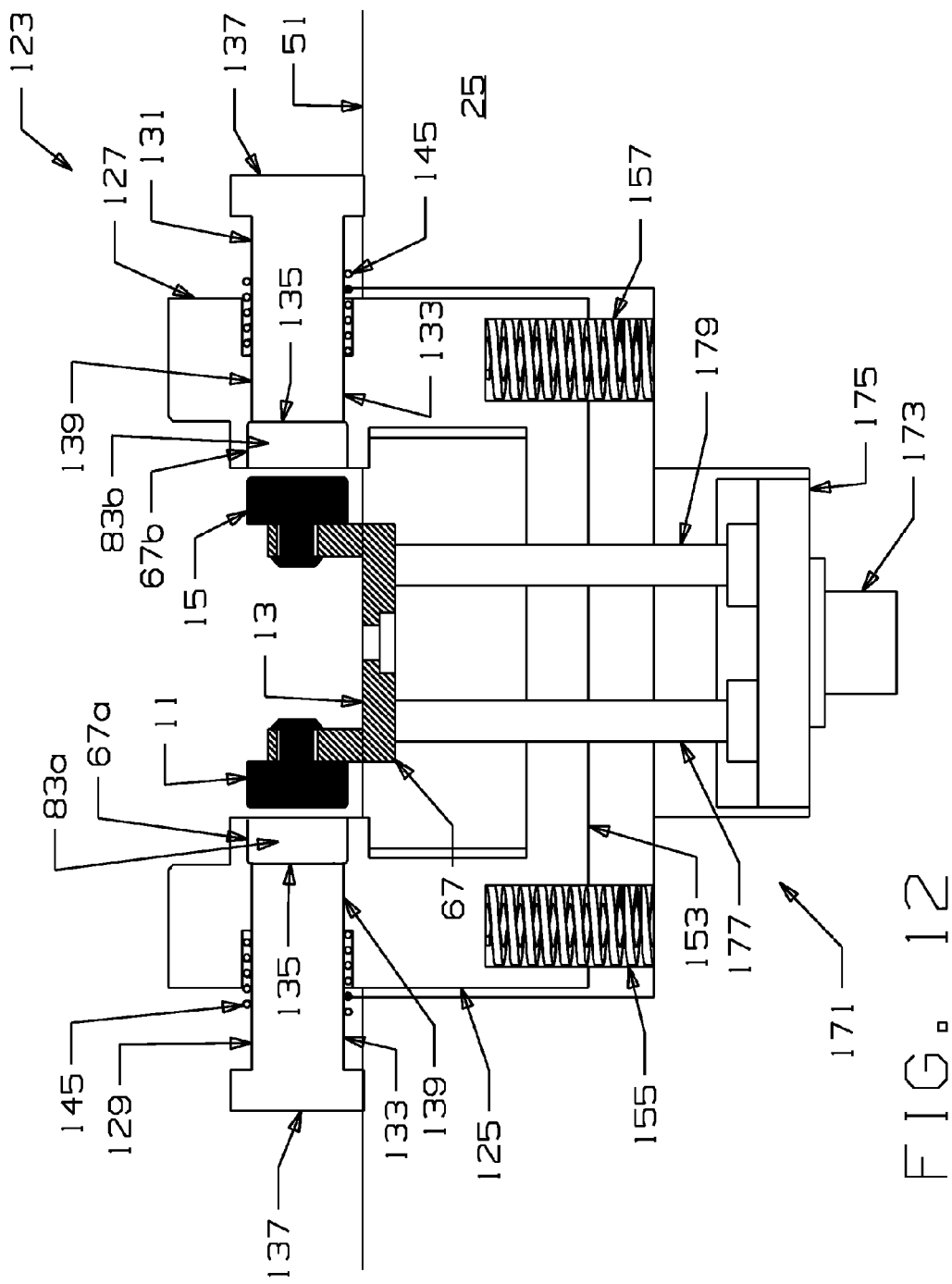
FIG. 12 is an enlarged schematic diagram taken along detail section 12 of FIG. 11.

In the example, it is necessary to displace mold portions 67a, 67b defining cavity portions 83a, 83b outward from mold portion 67 after part forming so that male portions 11a, 15a of formed parts 11, 15 are in axial alignment with female portions 13a, 13b of part 13 (FIGS. 2, 8, 12).

As can be appreciated, in other embodiments, it may be necessary to displace part 13 outwardly or inwardly in order to align that part with parts 11, 15. Thus, in certain embodiments it may be desired to move mold portion 67 inwardly and away from part 13 while holding part 13 in place while in other embodiments it may be desired to move part 13 outwardly from mold portion 67.

Release apparatus 151, as illustrated, comprises base 153 behind mold portion 67 joined to contact-element supports 125, 127 and springs 155, 157 which bias base 153 toward mold portion 67. Contact-element supports 125, 127 are positioned in openings 159, 161 of turret 25 permitting contact elements 129, 131 to travel outwardly and inwardly from face 51 as base 153 moves. Mold portions 67a, 67b travel with the respective contact-element support 125, 127 with contact element first ends 135 in alignment with mold portions 67a, 67b for part assembly. In the example, mold portions 67a, 67b and contact-element supports 125, 127 serve as part holders for parts 11 or 15 holding such parts in alignment for assembly.

Figure 6:
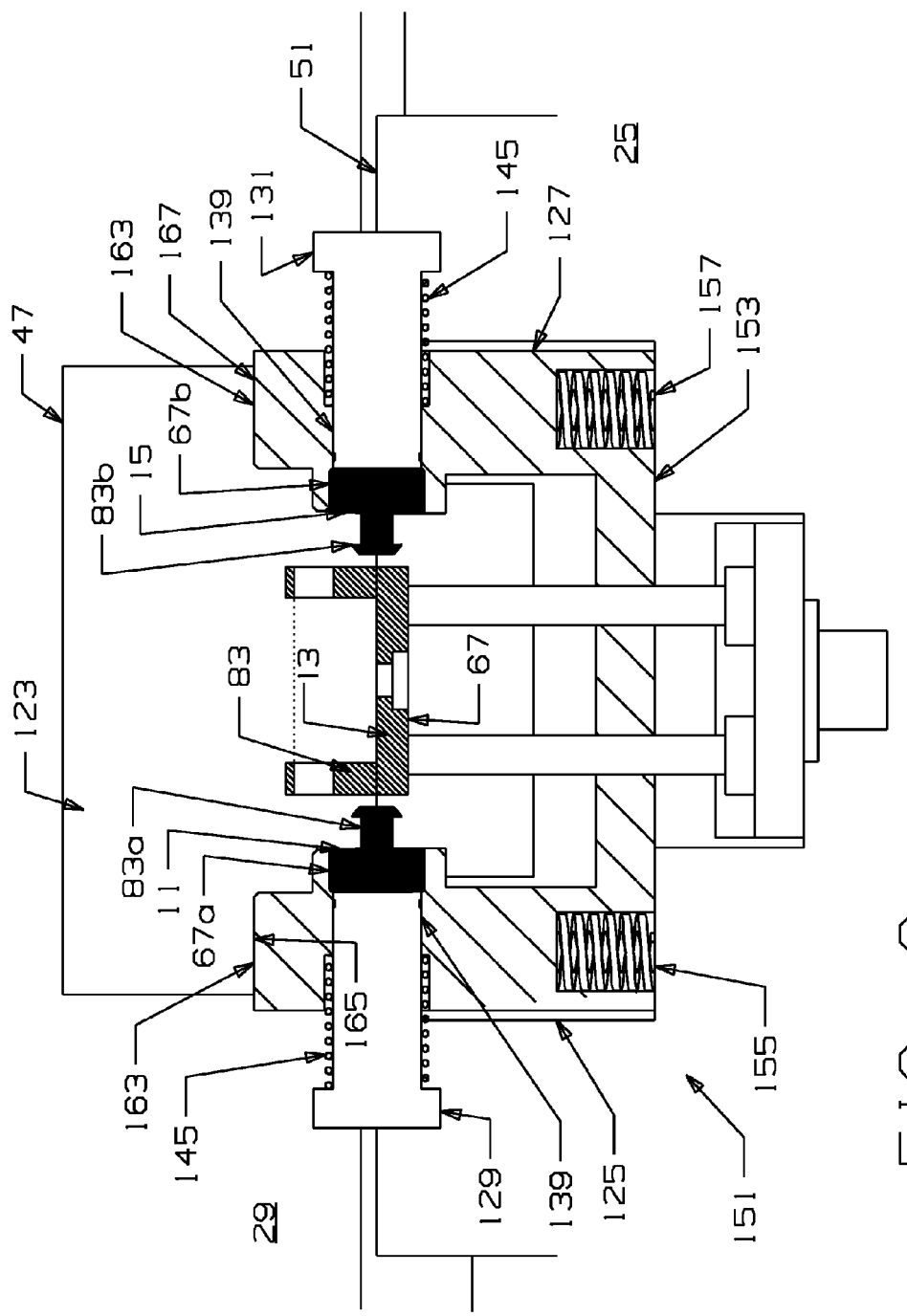
FIG. 6 is an enlarged schematic diagram of a mold cavity and formed parts taken along detail section 6 of FIG. 4.

Referring to FIG. 6, in the forming operating position A, mold portion 47 shoulder 163 contacts surfaces 165, 167 of contact-element supports 125, 127 and urges base 153 to retract away from mold portion 67 and face 51 so that contact-element supports 125, 127 and mold portions 67a, 67b are in position to receive the plastic material with mold cavities 83, 83a, 83b closed. Opening of mold portions 47, 67 releases the force applied to surfaces 165, 167 allowing springs 155,157 to bias base 153 toward mold portion 67 and contact-element supports 125, 127 and mold portions 67a, 67b outwardly from mold portion 67 to displace formed parts 11, 15 outward a sufficient distance so as to be in alignment with part 13 just prior to part assembly.

If it is desired to displace a part formed along an interior region of mold portion 67 (e.g., part 13) then release apparatus 151 may be provided with a part holder (not shown) extending from base 153 and having a surface which forms a part of mold portion 67. Plastic is formed against such surface in the forming position. The surface of the part holder may both partially release the part (e.g., part 13) from the mold portion 67 and hold such part proximate mold portion 67 for assembly when base 153 is biased toward mold portion 67 following mold opening.

Referring to FIGS. 9-10, assembly actuators 147, 149 drive contact elements 129, 131 inwardly in this example when turret 25 is in the assembly operating position C. Each assembly actuator 147, 149 is mounted in a cavity 169 provided in mold plate 31. Each assembly actuator 147, 149 has a rod which drives a contact element second end 137 driving a contact element first end 135 to urge a part (e.g., part 11 or 15) out of a mold portion 67a, 67b and into contact with an aligned part such as part 13 enabling, for example, male portion 11a to be seated in corresponding female portion 13a. Assembly actuators 147, 149 are preferably dual or single action linear actuators.

Other assembly actuators may be used in place of actuators 147, 149. By way of example, mold plates 29, 31 can serve as an assembly actuator. Ram-driven 35 relative displacement of mold plates 29, 31 toward one another can cause mold plates 29, 31 to contact and drive contact elements 129, 131 inward to assemble the formed plural parts (e.g., parts 11-15) when turret 25 is rotated 90° away from the forming position and in a position such as the operating position indicated by the letter B in FIG. 7. By way of further example, a pin (not shown) carried on mold plate 29 or 31 can be urged into contact with a contact element 129, 131 second end 137 also by ram-driven 35 relative displacement of mold plates 29, 31 with the turret rotated in the position indicated by the letter B in FIG. 7. As yet another example, extensible pins (not shown) guided by mold plates 29 or 31 or inserts within mold plates 29, 31 pushed forward by systems such as an ejector system within the mold plates or by other mechanical means (e.g, an actuator or mechanical linkage) can drive one or both contact elements 129, 131 to assemble the parts.

Assembly apparatus 123 may be provided in configurations other than those described herein. For example, one contact-element support (or three or more supports) could be utilized rather than two supports 125, 127. Contact elements 129, 131 could be mounted on supports 125, 127 for movement other than axial movement. Plural contact elements (e.g., elements 129, 131) may be supported on each contact-element support 125, 127.

Figure 13:
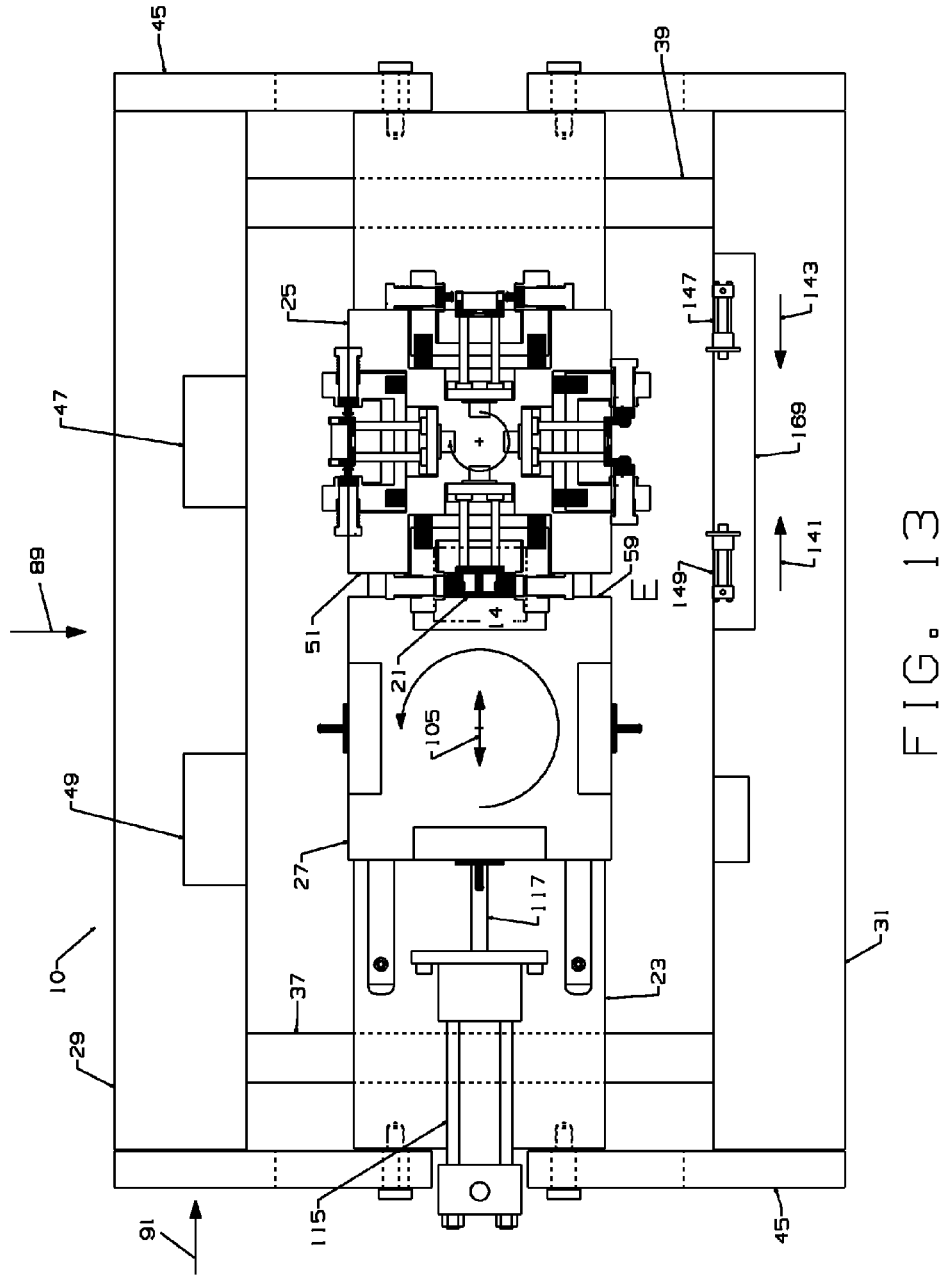
FIG. 13 is a schematic diagram showing a top view of the injection-molding and assembly apparatus taken along section 4-4 of FIG. 3 but with each turret in a final assembly operating position in which one turret is moved toward the other turret for assembly of parts into a final assembly.

Referring to FIGS. 8, 10, 12 and 14, ejection apparatus 171 may be provided for each face 51-57 and mold portion 67-73 of turret 25 to eject final assembly 21 from one of mold portions 67-73 following movement of turret 27 from the final assembly operating position indicated by position E in FIG. 13. Ejection apparatus may comprise a linear actuator 173 which urges ejector base 175 outward causing ejector pins 177, 179 to urge final assembly 21 fully out of mold portion 67. Final assembly 21 may be received onto a belt or other apparatus (not shown) for further processing.

Operation of actuators 35, 99, 113, 115, 147, 149, 173 is synchronized by any suitable controller (not shown) or combination of controllers known to persons of skill in the art. Representative controllers are Programmable Logic Controllers (PLCs).

Operation

Operation of the illustrated exemplary embodiment of an injection-molding and assembly apparatus 10 including two turrets 25, 27 will next be described. In FIGS. 3-15, apparatus 10 is shown with tooling provided for manufacture of an exemplary composite part final assembly 21 (FIGS. 1-2). It is to be understood that a broad range of parts can be made using injection-molding and assembly apparatus 10 and that the parts illustrated are merely representative.

Injection-molding and assembly apparatus 10 is configurable to provide the manufacturer with the capability to manufacture this broad part range. For example, injection molding and part assembly may occur in connection with each of turrets 25, 27 or a single turret 25. More than two turrets may be utilized. Production of a final assembly 21 by coordinated use of turrets 25, 27 is optional and represents an advantageous capability available to the manufacturer.

The following operational description of apparatus 10 relates to an example in which a part assembly 17 is formed and assembled along face 51 of turret 25 and a complementary part 19 is formed along face 59 of turret 27. It is to be understood that the following description is applicable to the processes occurring along each other like face of turret 25, 27.

Turning then to FIGS. 3 and 4, a production cycle begins with apparatus 10 shown in a forming operating position indicated by position A in which plastic parts 11-15 and 19 are formed by injection molding along faces 51, 59 of turrets 25, 27. As shown in FIG. 4, turrets 25, 27 are clamped between mold plates 29, 31 by ram-driven 35 movement of mold plate 31 toward mold plate 29.

First mold portion 47 supported on mold plate 29 is closed together against second mold portion 67 on face 51 to form mold cavity 83 and first mold portion 49 on mold plate 29 is closed together against second mold portion 75 on face 59 to form mold cavity 85. Mold portions 67a, 67b further form cavity portions 83a, 83b. Complementary mold portions 47, 67 and 49, 75 are clamped tightly together between mold plates 29, 31 in this mold-closed forming operating position shown in FIG. 4.

Plastic material is injected into mold plate 29 from barrels (not shown) in the directions indicated by the arrows 89, 91. The plastic material travels through a runner system and gate (not shown) and is injected into mold portions 47, 49 and into cavities 83, 85 to fill such cavities. Mold cavity 83 includes plural cavities defining plural parts 11-15 which will be assembled into a sub-assembly 17.

After the plastic material in mold cavities 83, 85 has cooled sufficiently to retain form, the mold cavities 83, 85 are opened by moving mold portions 67, 75 away from mold portions 47, 49 to the mold-opened position such as shown in FIG. 13. This displacement is accomplished by ram-driven movement of mold plate 31 away from base 23 and turrets 25, 27 along the path defined by arrows 33. Mold plate 31 moves base 23 and turrets 25, 27 away from mold plate 29 through linkage 45 to the mold-open position shown in FIG. 13. The formed parts 11-15, 19 remain associated with mold portions 67, 75 on turrets 25, 27.

As shown in FIG. 8, opening of mold cavities 83, 85 causes release apparatus 151 to displace contact-element supports 125, 127 and mold portions 67a, 67b outwardly to partially release formed plural parts 11 and 15 from mold portion 67 placing parts 11, in alignment for assembly with part 13 by contact elements 129, 131. It is not necessary to release complementary part 19 from mold portion 75 in this embodiment. In the example, parts 11, 15 are displaced sufficiently from mold portion 67 so that male parts 11a, 15a are axially aligned with corresponding female parts 13a, 13b.

Figure 7:
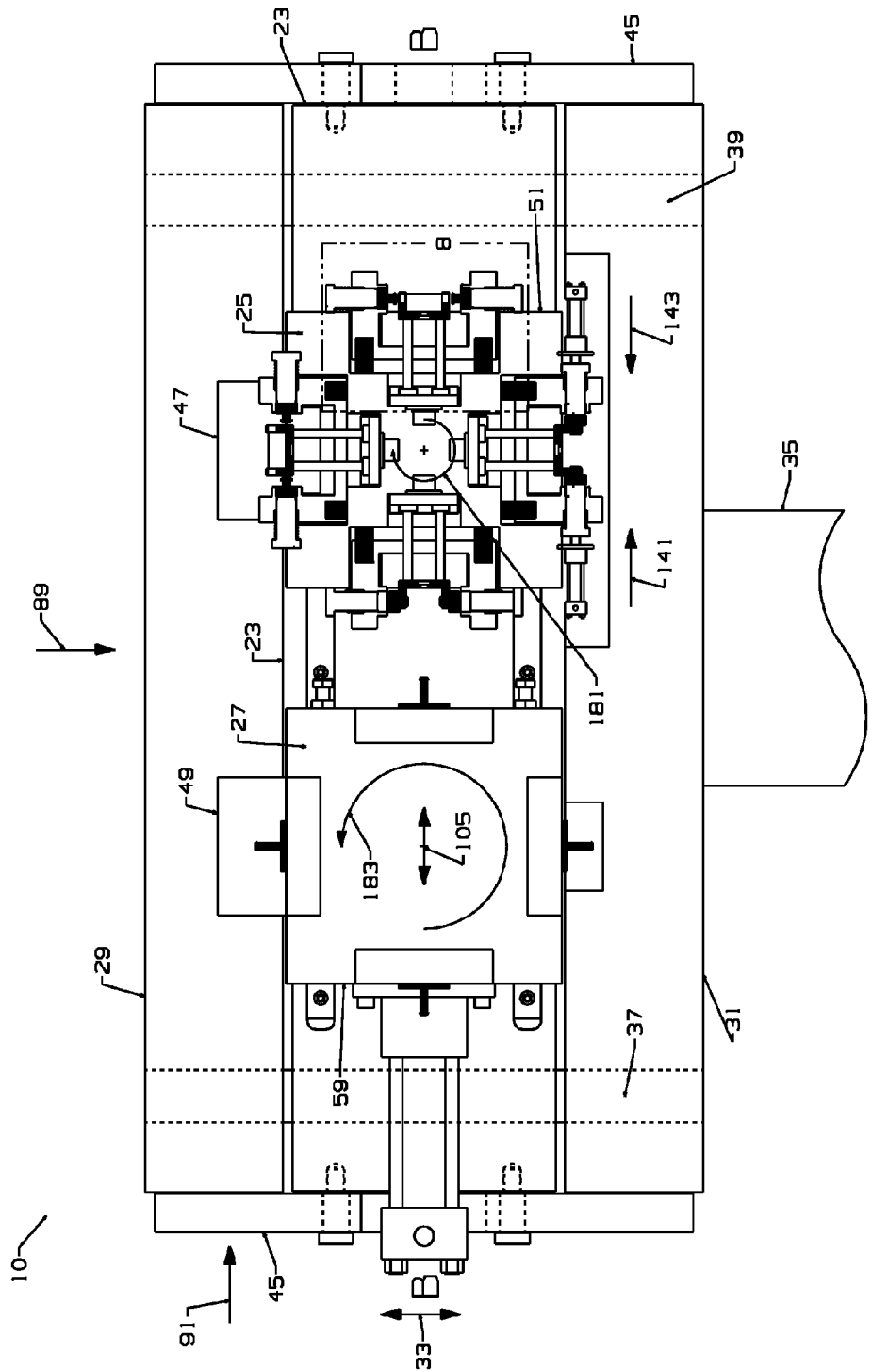
FIG. 7 is a schematic diagram showing a top view of the injection-molding and assembly apparatus taken along section 4-4 of FIG. 3 but with the turrets rotated 90° from the position of FIGS. 3-4. The apparatus is shown with each turret in a cooling operating position in which the formed parts are cooled.

Referring to FIGS. 7-8 and 13, with mold plates 29, 31 spaced from base 23 (FIG. 13), turrets 25, 27 are rotated by indexing apparatus 97, 111 to a cooling operating position indicated by position B. Turrets 25, 27 are rotated 90° in an indexed manner in the directions of arrows 181, 183 to arrive at the positions shown in FIG. 7. Ambient air and water circulating in turrets 25, 27 cool the formed parts 11-15, 19 carried on mold portions 67, 75.

While in the cooling operating position, ram-driven 35 movement of mold plate 31 toward mold plate 29 again clamps turrets 25, 27 between mold plates 29, 31 so that mold portions 47, 69 and 49, 77 are aligned and closed together to again provide cavities 83, 85 at a forming operating position along turret faces 53, 61 occurring simultaneously with the cooling operating position occurring along turret faces 51, 59. Ram-driven movement of mold plate 31 away from base 23 and mold plate 29 again opens mold cavities 83, 85 and displaces base 23 from mold plates 29, 31 as in FIG. 13 so that turrets 25, 27 may be rotated to the next position.

Referring now to FIGS. 9-10, turrets 25, 27 are next rotated a further 90° (i.e., 180° from the initial forming operating position) in an indexed manner by indexing apparatus 97, 111 in the directions of arrows 181, 183. After this further indexed rotation, turret face 51 and parts 11-15 are in an assembly operating position C and turret face 59 is in a further cooling operating position B. With face 51 in the assembly position and face 59 in the further cooling position, ram-driven movement of mold plate 31 again clamps turrets 25, 27 between mold plates 29, 31 urging mold portions 47, 71 and 49, 79 to close together again providing mold cavities 83, 85 at the forming operating position along turret faces 55, 63.

With faces 51, 59 in the assembly position of FIGS. 9-10, actuators 147, 149 drive contact elements 129, 131 held on supports 125, 127 inwardly in the directions of arrows 141, 143 causing first ends 135 of contact elements 129, 131 to respectively urge parts 11 or 15 together with part 13 to form sub-assembly 17. Male parts 11a and 15a are held in place within respective female portions 13a, 13b. Parts 11 and 15 could be sized to rotate on part 13 if desired. Springs 145 bias contact elements 129, 131 back to a retracted position after assembly. Ram-driven movement of mold plate 31 away from base 23 and mold plate 29 as in FIG. 13 again opens mold cavities 83, 85 and displaces base 23 from mold plates 29, 31 so that turrets 25, 27 may be rotated to the next position.

Figure 11:
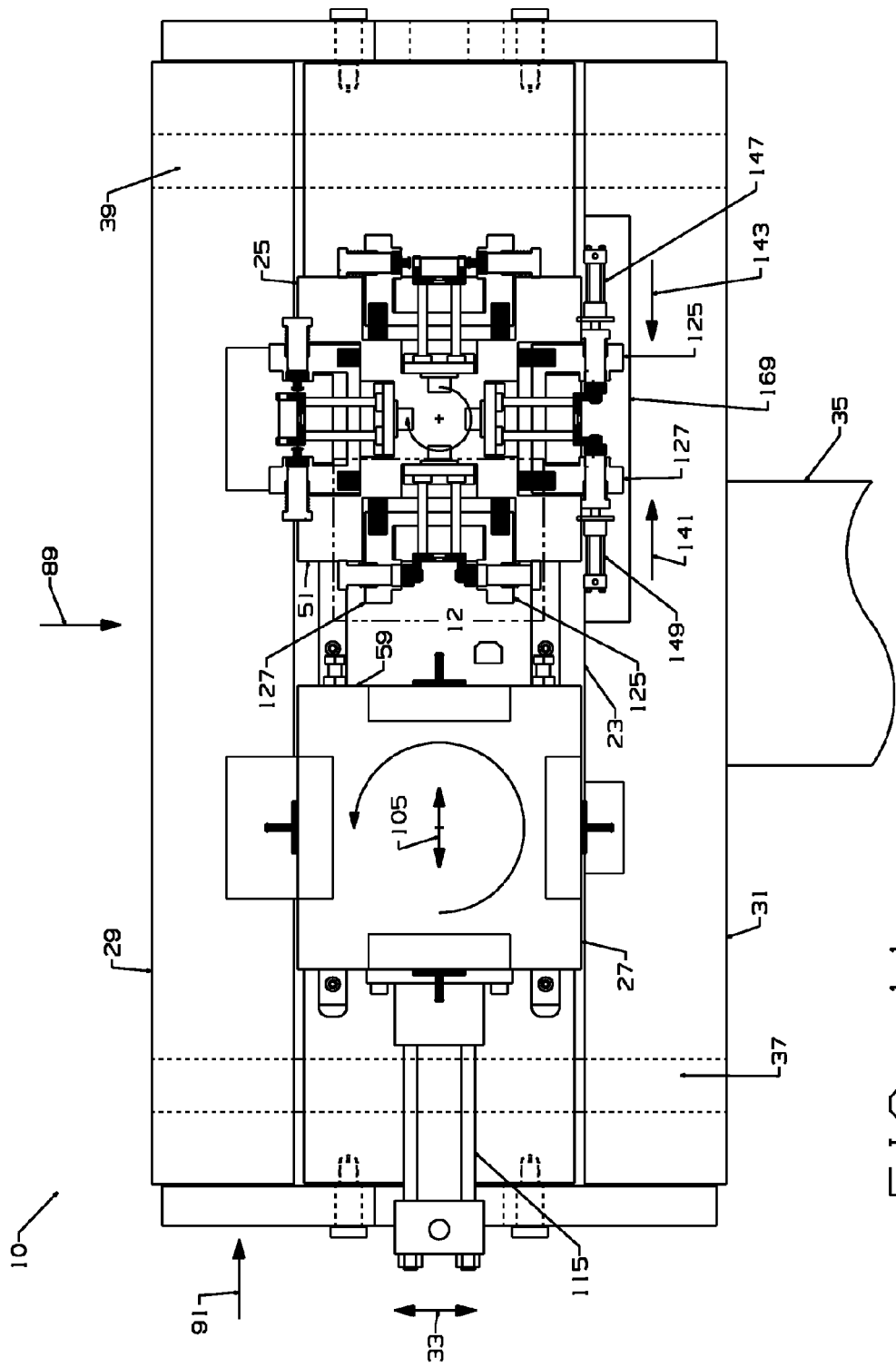
FIG. 11 is a schematic diagram showing a top view of the injection-molding and assembly apparatus taken along section 4-4 of FIG. 3 but with turrets rotated 270° from the position of FIGS. 3-4. The apparatus is shown with each turret in a pre-final assembly operating position.

Referring to FIGS. 11-12, indexing apparatus 97, 111 rotate turrets 25, 27 a further 90° (i.e., 270° from the initial forming operating position) in an indexed manner in the directions of arrows 181, 183 to a pre-final assembly operating position indicated by position D. Turret faces 51, 59 are now in a facing position with sub-assembly 17 facing complementary part 19 in alignment and ready for mechanical assembly to form final assembly 21. When mold plates 29, 31 are spaced apart from base 23 (FIG. 13) and turrets 25, 27 are in position D, carriage 101 supporting turret 27 can be displaced toward turret 25.

Figure 14:
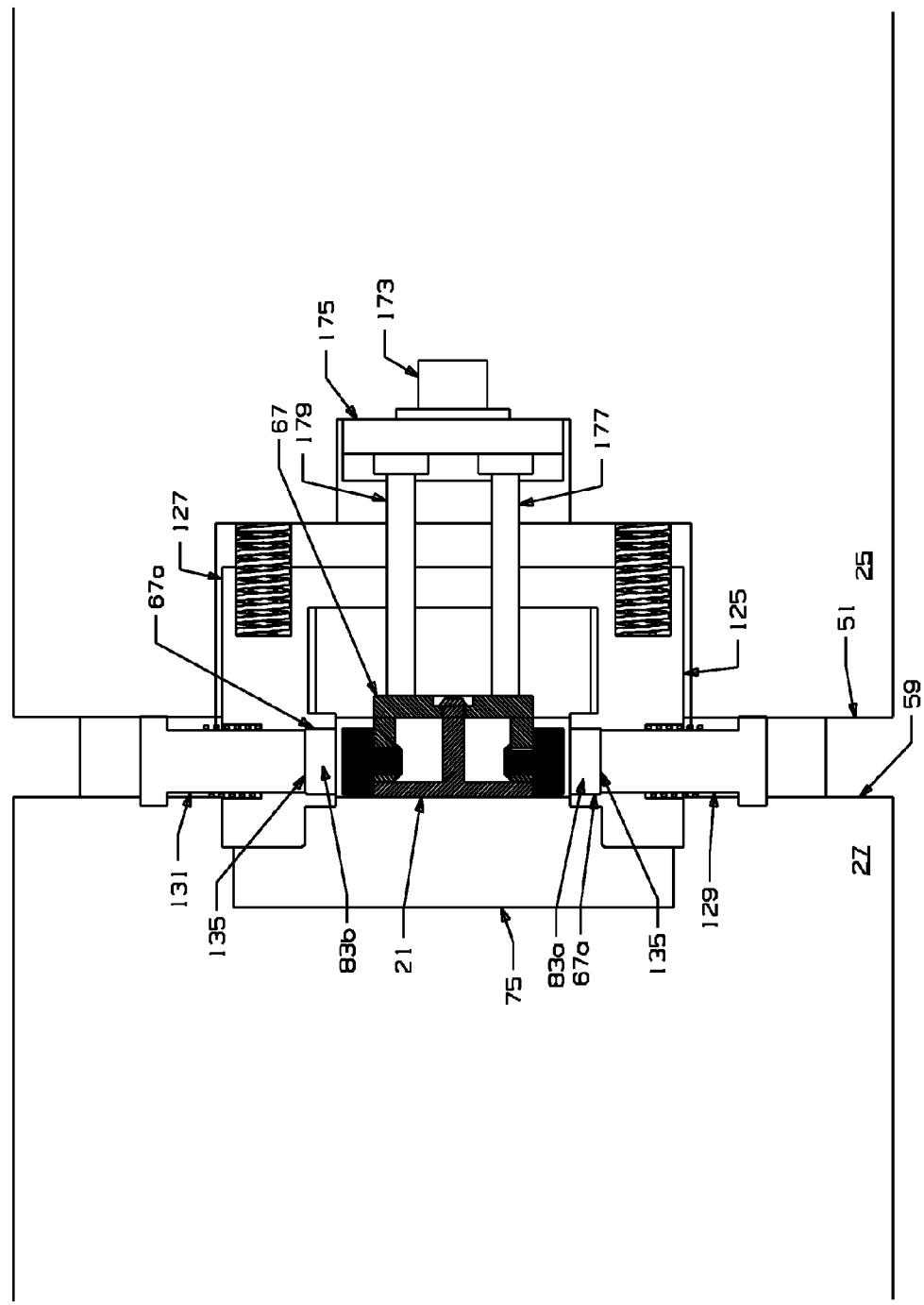
FIG. 14 is an enlarged schematic diagram taken along detail section 14 of FIG. 13.

Referring to FIGS. 13-14, actuator 115 drives carriage 101 along guide 103 toward turret 27 to the final assembly operating position indicated by position E. In this final assembly position, male part 19a is inserted into corresponding female part 13c of sub-assembly 17 by the relative displacement of turrets 25, 27. Part 19a is held in place by mechanically joining complementary part 19 and sub-assembly 17 into final assembly 21. Actuator 115 then drives carriage 101 away from turret 25 back to the position shown in FIGS. 4, 7, 9 and 11. Part 19 remains associated with the final assembly 21 in mold portion 67.

Figure 15:
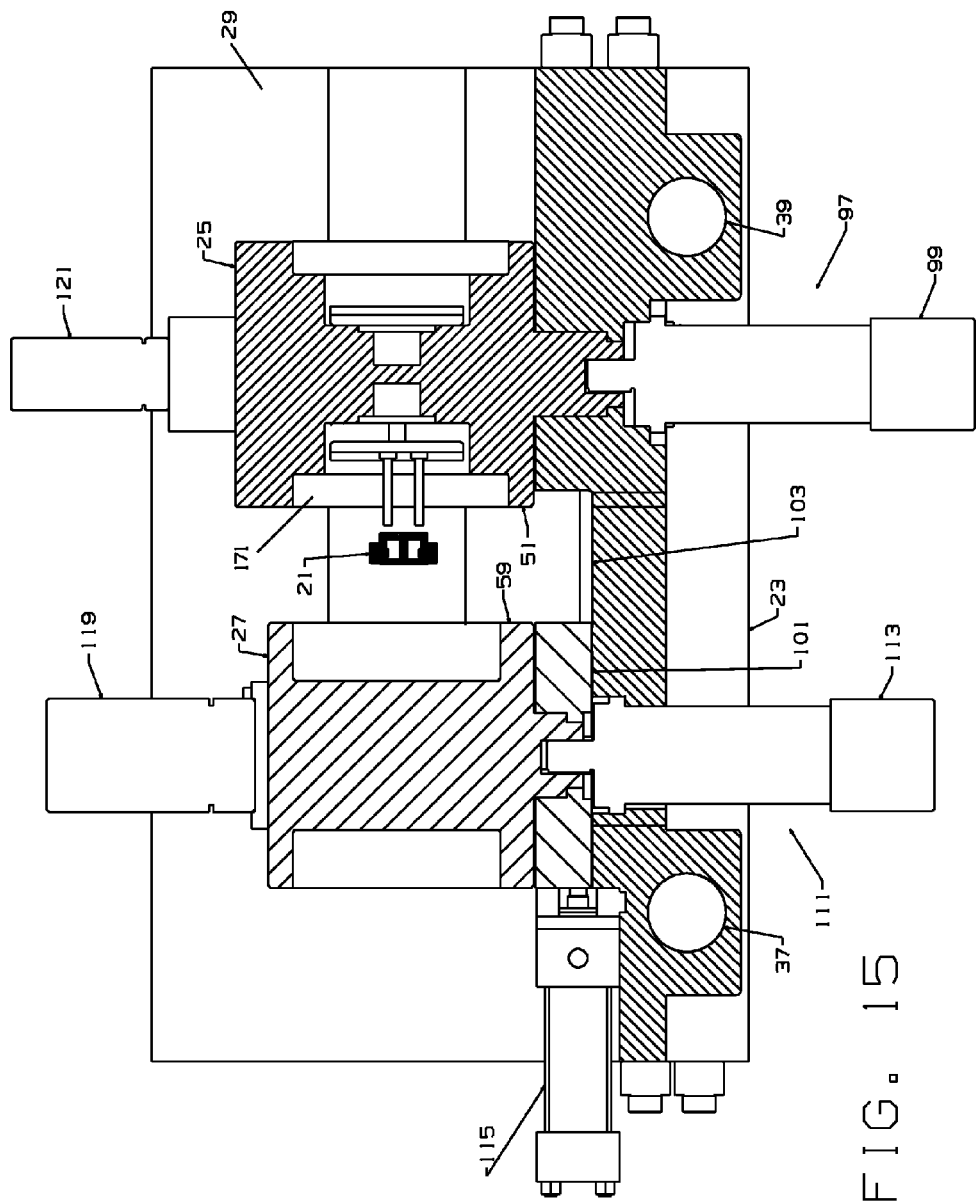
FIG. 15 is a schematic diagram showing a side elevation view of the injection-molding and assembly apparatus of FIG. 3 but with each turret in an ejection operating position in which one turret is moved away from the other turret and the final assembly is fully ejected. Certain surfaces are not shown to facilitate understanding.

As shown in FIG. 15, the final assembly 21 is ejected from mold portion 67 by ejection apparatus 171 completing the production cycle.

Next, indexing apparatus 97, 111 rotate turrets 25, 27 a further 90° (i.e., 360° from the initial forming operating position) in an indexed manner in the directions of arrows 181, 183 so that faces 51, 59 are returned to the forming operating position A in which mold portions 47, 67 and 49, 75 are again in alignment. Ram-driven 35 movement of mold plate 31 toward base 23 and mold plate 29 returns apparatus 10 to the position shown in FIG. 4 so that plastic material can again be received in mold cavities 83, 85 and a new production cycle commenced.

\* \* \*

While the principles of this invention have been described in connection with specific embodiments, it should be understood clearly that these descriptions are made only by way of example and are not intended to limit the scope of the invention.

What is claimed is:

1. An apparatus for molding and assembling a plurality of parts, the apparatus comprising:
    a mold plate;
    a turret including a contact element, wherein the turret is rotatable to a first position and a second position; and
    a mold including a first mold portion supported on the mold plate and a second mold portion supported on the turret with the first and second mold portions adapted to close together and displace apart from one another;
    wherein material is injectable into the mold to form the plurality of parts when the first and second mold portions are closed together and the turret is in the first position, the plurality of parts including at least a first part and a second part;
    wherein the first and second mold portions are displaced apart from one another after forming the first and second parts and the first and second parts remain with the second mold portion supported on the turret; and
    wherein the turret, the second mold portion, and the first and second parts are rotatable together relative to and without interference with the first mold portion to the second position where the contact element urges the first part into assembled contact with the second part.

2. The apparatus of claim 1, wherein the turret moves toward the mold plate to close the second mold portion together with the first mold portion.

3. The apparatus of claim 1, wherein the second mold portion is one of a plurality of second mold portions, and wherein the turret includes a plurality of faces and each face supports at least one of the plurality of second mold portions.

4. The apparatus of claim 1, wherein, when the turret is in the second position, the contact element is aligned with the first part and urges the first part into assembled contact with the second part.

5. The apparatus of claim 1, wherein, when the turret is in the second position, the contact element is axially aligned with the first part along an axis and urges the first part along the axis into assembled contact with the second part.

6. The apparatus of claim 1, further comprising an assembly actuator for driving the contact element.

7. The apparatus of claim 1, wherein the first and second parts are ejected from the second mold portion after the first and second parts are assembled.

8. The apparatus of claim 1, wherein, after the first and second mold portions are displaced apart from one another, one of the first and second parts is partially released from the second mold portion to align with the other of the first and second parts for assembling by the contact element.

9. The apparatus of claim 8, wherein the turret further comprises a base carried on the turret and a part holder supported on the base, wherein the base and the part holder are located behind the second mold portion and a surface of the part holder forms a portion of the second mold portion, and wherein the part holder holds the one of the partially released first and second parts in position for assembling with the other of the first and second parts.

10. The apparatus of claim 1, wherein the mold is a first mold and the turret is a first turret, the apparatus further comprising:
    a second turret rotatable to a third position and a fourth position; and
    a second mold including a third mold portion supported on the mold plate and a fourth mold portion supported on the second turret with the third and fourth mold portions adapted to close together and displace apart from one another;
    wherein material is injectable into the second mold to form a third part when the third and fourth mold portions are closed together and the second turret is in the third position;
    wherein the third and fourth mold portions are displaced apart from one another after forming the third part and the formed third part remains with the fourth mold portion supported on the second turret;
    wherein the second turret, the fourth mold portion, and the third part are rotatable together relative to and without interference with the third mold portion to the fourth position; and
    wherein at least one of the first and second turrets have relative movement toward one another to assemble the third part with the previously assembled first and second parts.

11. An apparatus for molding and assembling a plurality of parts, the apparatus comprising:
    a turret including a contact element, wherein the turret is rotatable to a first position and a second position; and
    a mold including a first mold portion and a second mold portion with the second mold portion supported on the turret, the first and second mold portions are adapted to close together and displace apart from one another;
    wherein material is injectable into the mold to form the plurality of parts when the first and second mold portions are closed together and the turret is in the first position, the plurality of parts including at least a first part and a second part;

wherein the first and second mold portions are displaced apart from one another after forming the first and second parts and the first and second parts remain with the second mold portion supported on the turret; and wherein the turret, the second mold portion, and the first and second parts are rotatable together relative to and without interference with the first mold portion to the second position where the contact element urges the first part into assembled contact with the second part.

12. The apparatus of claim 11, wherein the turret moves toward the mold plate to close the second mold portion together with the first mold portion.

13. The apparatus of claim 11, wherein the second mold portion is one of a plurality of second mold portions, and wherein the turret includes a plurality of faces and each face supports at least one of the plurality of second mold portions.

14. The apparatus of claim 11, wherein, when the turret is in the second position, the contact element is aligned with the first part and urges the first part into assembled contact with the second part.

15. The apparatus of claim 11, wherein, when the turret is in the second position, the contact element is axially aligned with the first part along an axis and urges the first part along the axis into assembled contact with the second part.

16. The apparatus of claim 11, further comprising an assembly actuator for driving the contact element.

17. The apparatus of claim 11, wherein first and second parts are ejected from the second mold portion after the first and second parts are assembled.

18. The apparatus of claim 11, wherein, after the first and second mold portions are displaced apart from one another, one of the first and second parts is partially released from the second mold portion to align with the other of the first and second parts for assembling by the contact element.

19. The apparatus of claim 18, wherein the turret further comprises a base carried on the turret and a part holder supported on the base, wherein the base and the part holder are located behind the second mold portion and a surface of the part holder forms a portion of the second mold portion, and wherein the part holder holds the one of the partially released first and second parts in position for assembling with the other of the first and second parts.

20. The apparatus of claim 11, wherein the mold is a first mold and the turret is a first turret, the apparatus further comprising:

a second turret rotatable to a third position and a fourth position; and a second mold including a third mold portion and a fourth mold portion with the fourth mold portion supported on the second turret; the third and fourth mold portions are adapted to close together and displace apart from one another;

wherein material is injectable into the second mold to form a third part when the third and fourth mold portions are closed together and the second turret is in the third position;

wherein the third and fourth mold portions are displaced apart from one another after forming the third part and the formed third part remains with the fourth mold portion supported on the second turret;

wherein the second turret, the fourth mold portion, and the third part are rotatable together relative to and without interference with the third mold portion to the fourth position; and wherein at least one of the first and second turrets have relative movement toward one another to assemble the third part with the previously assembled first and second parts.

* * * * *